US012033650B2

(12) United States Patent
Fraser et al.

(10) Patent No.: US 12,033,650 B2
(45) Date of Patent: Jul. 9, 2024

(54) DEVICES, SYSTEMS, AND METHODS OF NOISE REDUCTION

(71) Applicant: Beacon Hill Innovations Ltd., Victoria (CA)

(72) Inventors: Craig Fraser, Victoria (CA); Daniel Davies, Victoria (CA); John Horstmann, San Jose, CA (US); Lars Christensen, Sidney (CA)

(73) Assignee: Beacon Hill Innovations Ltd., Victoria (CA)

( * ) Notice: Subject to any disclaimer, the term of this patent is extended or adjusted under 35 U.S.C. 154(b) by 278 days.

(21) Appl. No.: 17/528,874

(22) Filed: Nov. 17, 2021

(65) Prior Publication Data

US 2023/0154481 A1 May 18, 2023

(51) Int. Cl.
*G10L 21/0216* (2013.01)
*H04R 1/10* (2006.01)

(52) U.S. Cl.
CPC ........ *G10L 21/0216* (2013.01); *H04R 1/1083* (2013.01); *G10K 2210/1081* (2013.01); *H04R 2460/01* (2013.01)

(58) Field of Classification Search
CPC .............. G10L 21/0216; H04R 1/1083; H04R 2460/01; G10K 2210/1081
See application file for complete search history.

(56) References Cited

U.S. PATENT DOCUMENTS 5,412,735 A * 5/1995 Engebretson ........ H04R 25/505 381/94.1
6,249,757 B1 * 6/2001 Cason ..................... G10L 25/78 704/214

(Continued)

FOREIGN PATENT DOCUMENTS

CA 2 485 644 A1 11/2003

OTHER PUBLICATIONS

Drago, P., A. Molinari, and F. Vagliani. "Digital dynamic speech detectors." IEEE Transactions on Communications 26.1 (1978): 140-145. (Year: 1978).*
Fukuda, Takashi, Osamu Ichikawa, and Masafumi Nishimura. "Long-term spectro-temporal and static harmonic features for voice activity detection." IEEE Journal of Selected Topics in Signal Processing 4.5 (2010): 834-844. (Year: 2010).*

(Continued)

*Primary Examiner* — Brian L Albertalli

(57) ABSTRACT

A method of real-time noise reduction including generating spectral data using temporally localized spectral representations of a received audio signal, determining detection of voice by comparing first and second filtered data, and generating noise-reduced audio output by attenuating noise based on the determined detection of voice. The first and second filtered data are formed by attenuating temporal variations of the spectral data based on, respectively, a first timescale and a second timescale. A noise reduction system, comprising processing circuitry configured to execute a method of real-time noise reduction to generate an output that is transmitted via an output port of the noise reduction system. A noise-reduction microphone comprising a housing having a transducer coupled to a processor therein to execute a method of real-time noise reduction, and an output port. A non-transitory computer-readable medium having instructions to cause a processor to perform a method of real-time noise reduction.

20 Claims, 9 Drawing Sheets

(56) References Cited

U.S. PATENT DOCUMENTS

| | | | | |
|---|---|---|---|---|
| 6,453,285 | B1 * | 9/2002 | Anderson | G10L 25/78 704/226 |
| 6,718,301 | B1 * | 4/2004 | Woods | G10L 25/78 704/226 |
| 6,963,649 | B2 | 11/2005 | Vaudrey et al. | |
| 7,742,914 | B2 * | 6/2010 | Kosek | G10L 21/0208 704/E21.009 |
| 9,343,057 | B1 | 5/2016 | Shahmurad et al. | |
| 9,355,648 | B2 | 5/2016 | Tsujikawa et al. | |
| 9,781,675 | B2 | 10/2017 | Mofidi et al. | |
| 10,499,139 | B2 | 12/2019 | Ganeshkumar | |
| 10,896,682 | B1 | 1/2021 | Dusan | |
| 2004/0021472 | A1 | 2/2004 | Carney et al. | |
| 2007/0237271 | A1 * | 10/2007 | Pessoa | G10L 21/0208 375/346 |
| 2010/0172510 | A1 | 7/2010 | Juvonen | |
| 2012/0046772 | A1 * | 2/2012 | Dickins | G10L 25/78 700/94 |
| 2017/0125033 | A1 * | 5/2017 | Kjems | G10L 21/038 |
| 2017/0347207 | A1 * | 11/2017 | De Haan | H04R 25/353 |
| 2019/0259381 | A1 | 8/2019 | Ebenezer | |
| 2020/0066268 | A1 | 2/2020 | Erell | |
| 2020/0098355 | A1 | 3/2020 | Lee et al. | |

OTHER PUBLICATIONS

Portnoff, Michael. "Implementation of the digital phase vocoder using the fast Fourier transform." IEEE Transactions on Acoustics, Speech, and Signal Processing 24.3 (1976): 243-248. (Year: 1976).*

Soberton Inc., "EM Electret Condenser Microphone Acoustic Product Specification, Product No. EM-4015N" Feb. 14, 2019, available at https://www.digikey.com/en/products/detail/soberton-inc/em-4015n/8600784. (Year: 2019).*

S. Vaseghi, "Spectral Subtraction", Advanced Digital Signal Processing and Noise Reduction, Second Edition, John Wiley & Sons, 2008, pp. 333-354 See Spc., p. 1.

Audiophile, www.salientsciences.com, 2022.

Y. Ephraim et al., "Speech Enhancement Using a Minimum Mean-Square Error Short-Time Spectral Amplitude Estimator", IEEE Transactions on Acoustics, Speech, and Signal Processing, vol. ASSP-32, No. 6, Dec. 1984, pp. 1109-1121.

P. Rao et al., "Implementation and Evaluation of Spectral Subtraction with Minimum Statistics using WOLA and FFT Modulated Filter Banks", Blekinge Institute of Technology, Jan. 2014, pp. 1-55.

J. Ramirez et al., "Efficient voice activity detection algorithms using long-term speech information", Science Direct, Speech Communication 42 (2004), pp. 271-287.

* cited by examiner

DEVICES, SYSTEMS, AND METHODS OF NOISE REDUCTION

TECHNICAL FIELD

The disclosure relates generally to systems and methods for noise cancellation, particularly for cancelling of noise during audio capture.

BACKGROUND

Reducing noise in a noisy audio signal (noise cancellation) is important in several applications. The noise may be background noise, e.g. ambient or low-frequency noise.

Many approaches used for noise cancellation rely on estimating the noise and then reducing the effect of this noise on the noisy audio signal. Noise estimation is based on parts of the noisy signal where substantially only noise is present. For example, voice activity detection (VAD) algorithms may be used to detect portions of the signal having voice so that noise estimation may be performed without these portions.

US Patent Publication No. 2020/0066268 A1 discloses a method of noise cancellation (echo cancellation) including calculating a voice presence probability based on noise and voice parameters, and cancelling noise based on the voice presence probability. The noise and voice parameters are previously determined based a noise-period and a voice-period, identified based on the timing of a voice trigger, e.g. "OK Google". A voice probability calculator continuously estimates the probability that voice is present in the received audio. Calculating probabilities and updating parameters may be relatively computationally expensive for real-time computing applications, e.g. an audio digital signal processor with a small energy consumption footprint may take considerably more than 100 ms for such a calculation.

Spectral subtraction is a popular method used in existing noise cancellation systems for reducing noise in captured audio, e.g. as described in Chapter 11 "Spectral Subtraction" of Vaseghi, Saeed V. *Advanced digital signal processing and noise reduction*, John Wiley & Sons, 2008. In spectral subtraction, an estimate of the noise spectrum is subtracted (as described below) from the noisy signal spectrum to achieve noise cancellation. Discrete Fourier transforms are used to transform into and out of the frequency domain, where the subtraction is carried out. The noise is assumed to be additive and a slowly varying or stationary process. The noise spectrum estimation is periodically updated, with a further assumption that the estimate does not vary appreciably between updates. For the subtraction step in spectral subtraction, the magnitude of the estimated noise spectrum is subtracted from the magnitude of the noisy signal, frequency by frequency, but the phase is left unchanged for a variety of reasons, e.g. only estimates of the magnitude of the noise spectrum may be available and/or removing phase information associated with the noise from the noisy signal may be intractable, difficult to achieve with high reliability, or computationally expensive. Subtraction of noise magnitudes from the noisy signal magnitudes can lead to negative predictions of reduced-noise signals, which then requires nonlinear rectification that leads to distortion in the reduced-noise signal, particularly when the signal to noise ratio is low.

Multi-microphone noise cancellers, i.e. configurations of spatially distributed transducers, have been proposed to improve noise cancellation performance, e.g. by improving noise estimates, since spatial and directional information so obtained can be leveraged to separate out noise from a noisy signal. U.S. Pat. No. 6,963,649 discloses a noise cancelling microphone system having two adaptive filters, wherein a first adaptive filter equalizes two omni-directional microphone and a second adaptive filter then performs noise control. The two omni-directional microphones may be facing opposite directions but are disposed in the same microphone housing. Multiple microphone configurations increase the cost, design complexity, and also frequently the computational overhead associated with processing multiple separate signals.

SUMMARY

Increased digitalization across society, including in workplaces and schools, and pandemic-induced challenges has led to rapid adoption of audio and/or video tools within workplaces, remote work, and school. Background noise is a significant issue when using such tools, especially with rising use of such tools from coworking spaces, while mobile, and while working from home.

Noise reduction to enhance a voice (which includes music or other user-intended audio) signal can greatly improve user experience and improve productivity. Previously known methods of noise reduction in a captured noisy audio signal are difficult to implement in real-time while providing the desired acoustic quality of the final signal in a cost-effective manner.

In various embodiments of noise-reduction system disclosed herein, low latency and high-fidelity noise reduction may be achieved, e.g. a latency of 5.3 ms may be achieved.

Of the existing methods used for noise cancellation, higher quality noise cancellation is typically achieved in methods involving sophisticated algorithms processing one or more audio signals. However, the more sophisticated algorithms tend to be those that are also computationally demanding and may lead to high latency, i.e. large delay between receipt of unprocessed audio signals by a processing unit such as a digital signal processor (DSP) and an output comprising noise-reduced audio signals. For example, it is found that several existing methods lead to latencies of greater than 20 ms, which may be unacceptably high for discerning users such as musicians or students attending virtual music classes.

Due to issues of latency, previous methods may include filtering the noisy audio signal to remove an estimated noise throughout the entire signal without any "off" periods since turning the filtering on and off with latency may lead to artifacts such as "whooshing" sounds. For example, humans may momentarily stop during a monologue to catch a breath, provide appropriate emphasis, or simply to provide relative silence between words or phrases. If such fleeting periods are too short for a noise cancellation system to detect to re-start noise reduction or if the detection is delayed, the noisy background may intervene and degrade the noise reduction quality.

In applications such as surveillance of telephone lines ("wire-tapping"), where captured audio is not evaluated in real-time and may be post-processed to improve quality or where the acoustic quality of the audio after noise reduction is not a high priority, the significant delay induced by noise reduction may not be particularly detrimental. However, in several real-time applications, the acoustic quality of the output signal is important.

In addition to latency-related issues, existing methods may distort voice, e.g. as described in the background section.

Noises may be masked instead of, or in addition to, being removed to reduce aurally perceived signal degradation. It is found that masking of background noises may be increased during periods of voice activity by raising of a person's voice (or volume of the object producing the voice) and/or bringing a transducer closer to the voice generation location. However, these methods are not effective during periods without voice, however short, e.g. including the fleeting periods of stoppage of speech mentioned previously. Providing strong noise reduction, including 100% attenuation, during these periods of relative voice silence, and relying on masking of noises and/or other (milder) types of noise reduction during periods of voice activity, may provide effective noise cancellation.

Higher fidelity noise reduction may be achieved by more accurate and more up to date noise estimates. Estimates of noise may be determined using periods of no voice activity. Capturing more periods of no voice activity may facilitate more accurate noise estimates due to large ensembles. More frequently updated noise estimates may facilitate more up to date noise estimates. Low latency voice detection may enable capturing more, and shorter, periods of no voice activity and hence may facilitate higher fidelity noise reduction.

It is found that providing enhanced noise reduction during periods when there is no voice can facilitate noise reduction that renders high acoustic quality output if performed in real-time with low latency. Periods when there is no voice may be periods where the primary signal, such as human voice or music, is not present. In some cases, no noise reduction may be provided when there is voice detected. For example, the relative amplitude of the voice (i.e. the primary signal) may effectively mask the underlying noise, as perceived by a human ear.

Systems and methods for efficient detection of the presence of voice are needed.

It is found that high-fidelity and low latency detection of voice in a noisy signal may be achieved by evaluating temporal variations in the spectrum of the noisy audio signal, or in a quantity appropriately indicative thereof, e.g. the squared magnitude of the spectral components. Such detection of voice in a noisy signal may also facilitate frequent noise estimates, as shorter periods may be eligible for noise estimation.

It is found that voice activity may result in some change to the noise spectrum that is averaged or smoothed over short times and comparatively lesser change to the noise spectrum that is averaged or smoothed over relatively long times, causing them to differ. In the absence of voice activity, these two smoothed spectra will be similar if the noise spectrum is stationary or slowly varying. Note that the noise spectrum itself may contain high, low, and intermediate frequency components but there may be a frequency (i.e. timescale), separation with respect to the variation of the components of the noise spectrum itself relative to those of the voice spectrum.

Efficient evaluation of temporal variations in a signal may be achieved using one or more low-pass filters and/or other analog or digital processing modules or methods. Efficient detection of voice may be achieved at least partially due to efficient evaluation of temporal variations in a signal. For example, efficient, low-latency noise cancellation may be thereby achieved with a single microphone. In some embodiments described herein, a latency of 5.3 ms may be achieved.

In one aspect, the disclosure describes a method of real-time noise reduction for audio signals to enhance, with low latency, voice content relative to non-voice content of the audio signals, comprising: receiving a time-resolved signal indicative of audio; generating time-resolved spectral data using temporally localized spectral representations of the time-resolved signal; determining detection of voice by comparing first filtered data and second filtered data, the first filtered data formed by attenuating temporal variations of the time-resolved spectral data based on a first timescale, the second filtered data formed by attenuating temporal variations of the time-resolved spectral data based on a second timescale different than the first timescale; and generating a time-resolved output indicative of noise-reduced audio by processing the time-resolved signal to attenuate non-voice content relative to voice content based on determined detection of voice In another aspect, there is disclosed a non-transitory computer-readable medium or media having stored thereon machine interpretable instructions which, when executed by a processor of a computing device, cause the processor to perform a method of real-time noise reduction for audio signals to enhance, with low latency, voice content relative to non-voice content of the audio signals.

In yet another aspect, the disclosure describes a noise-reduction microphone for enhancing, with low latency and in real-time, voice content of captured audio signals relative to non-voice content, comprising: a housing; a transducer disposed in the housing and configured to convert sound waves to a time-resolved signal indicative of audio; a processor disposed in the housing and coupled to the transducer; memory coupled to the processor and storing processor-executable instructions that, when executed, configure the processor to: receive the time-resolved signal from the transducer, generate time-resolved spectral data based on the time-resolved signal, determine detection of voice by comparing first filtered data and second filtered data, the first filtered data formed by attenuating temporal variations of the time-resolved spectral data based on a first timescale, the second filtered data formed by attenuating temporal variations of the time-resolved spectral data based on a second timescale different than the first timescale, and generate a time-resolved output indicative of noise-reduced audio by processing the time-resolved signal to attenuate non-voice content relative to voice content based on determined detection of voice; and an output port coupled to the processor and configured to transmit the time-resolved output.

In a further aspect, the disclosure describes a noise reduction system, comprising: processing circuitry configured to receive a time-resolved signal indicative of audio, generate time-resolved spectral data based on the time-resolved signal, determine detection of voice by comparing first filtered data and second filtered data, the first filtered data formed by attenuating temporal variations of the time-resolved spectral data based on a first timescale, the second filtered data formed by attenuating temporal variations of the time-resolved spectral data based on a second timescale different than the first timescale, and generate a time-resolved output indicative of noise-reduced audio by processing the time-resolved signal to attenuate non-voice content relative to voice content based on determined detection of voice; and an output port in electrical communication with the processing circuitry to transmit the time-resolved output to an external device configured to receive the time-resolved output.

In an example embodiment, a digital signal processor may be used to generate time-resolved spectral data of an audio signal using a short-time Fourier transform with a predefined window width, i.e. a Fourier spectrum may be obtained at each time step. The temporal variations in the time-resolved spectral data may then be evaluated by comparing the output of two separate low-pass filters with distinct time constants chosen based on predetermined timescales of the noise and the voice. The comparison may take the form of a (squared) $L_2$ error, or frequency-weighted average $L_2$ error, between the filter outputs. Such an evaluation may be used to detect presence or absence of voice. In case of detected absence of voice, the audio signal may be attenuated (e.g. up to 100%) or subjected to existing methods of noise cancellation including filtering. In case of detected presence of voice, the audio signal may be left unprocessed, mildly enhanced (e.g. by amplification), or mildly subjected to existing methods of noise cancellation.

Embodiments can include combinations of the above features.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The following disclosure relates to noise reduction or cancellation for microphones. In some embodiments, high-fidelity noise reduction may be achieved with low latency, which may be useful in real-time application. In some embodiments, this is provided using a single capsule microphone with built-in digital noise reduction.

In spectral subtraction noise reduction using the short time Fourier transform, an input signal is first buffered, when enough data has been received, the data is transformed to the frequency domain, the magnitude (squared) of the input signal in the frequency domain is then calculated and used to estimate noise, which then allows calculation of the spectral gain needed for noise reduction. The spectral gain may be applied to the input magnitude while keeping the input phase intact. This new spectrum may be then transformed back into the time domain.

The spectral gain may be calculated as a function of estimated noise and input spectrum. In some cases, to reduce audio artefacts, the spectral gain may be limited to allow only attenuation and is smoothed to reduce sudden changes in value.

The noise estimate for the spectral gain calculation may be obtained by low pass filtering the noise spectrum, when no voice activity is detected.

A voice activity detector (VAD) may be implemented based on an observation that, for noise, a (time-resolved) noise spectrum smoothed over short time is typically similar, by some comparison, to one smoothed over a long time. On the other hand, it is observed that voice activity may cause some change to the noise spectrum smoothed over short time and relatively less change to one smoothed over a long time, causing them to differ. A statistically stationary or slowly varying noise spectrum may generally result in similar noise spectra after smoothing.

In some cases, the comparison of the short-time smoothed and long-time smoothed (time-resolved) noise spectra may be a frequency weighted average squared distance between the two spectra. Once this distance is below a defined threshold, the noise estimate may be updated, since no voice may be detected.

Aspects of various embodiments are now described in relation to the figures.

Figure 1:
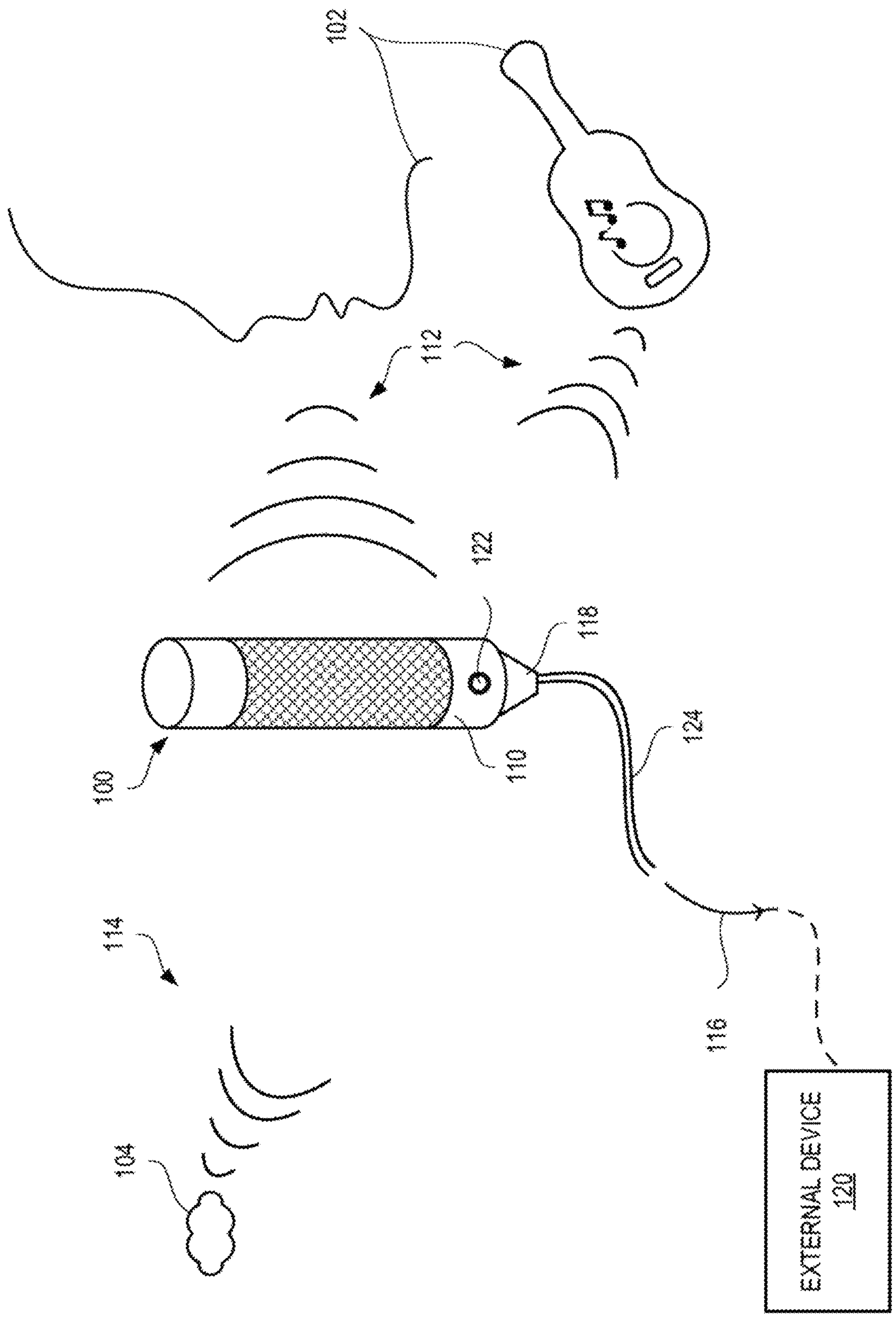
FIG. 1 is a schematic diagram of a noise-reduction microphone during use, in accordance with an embodiment.

FIG. 1 is a schematic diagram of a noise-reduction microphone 100 during use, in accordance with an embodiment.

The noise-reduction microphone may be placed in an environment having voice source(s) 102 and noise source(s) 104.

Voice source(s) 102 may include vocalizing human voice source(s), a music instrument generating sounds, and/or other sound sources that are intended by a user to be captured by the microphone.

Noise source(s) 104 may generally include ambient noise sources in the environment, and noise generating things like air conditioning, vehicles, medical equipment (including beeping sounds), and office equipment such as printers.

As referred to herein, “noise” and “voice” may be defined relative to one another. For example, “noise” may generally refer to sounds whose spectral structure does not change appreciably relative to the (user-intended) “voice”. For example, both noise and voice may include both high frequency components and low frequency components in similar spectral bands, but the magnitudes of these spectral components may vary more slowly (or not at all) in the noise compared to the voice. The two spectra may vary on separate, distinct timescales. It is found that the sounds delineated by such a description of noise correspond to an ordinary user’s perception of unintended background sounds.

As described later, in some cases, voice source(s) 102 may be limited to human-generated voices (or simulants thereof). For example, high-performance noise cancellation may be achieved for such sounds, in some instances.

The noise-reduction microphone 100 may comprise a housing 110 having mounted therein a transducer (not shown) for converting sound waves 112, 114 into signals indicative of audio, such as digital audio signals.

The signals generated by the transducer may include voice content and non-voice content indicative of, respectively, audio associated with sound waves 112 of voice source(s) 102 and sound waves 114 of noise source(s) 104A.

The noise-reduction microphone 100 may include processing circuitry for real-time noise reduction to generate time-resolved output 116 indicative of noise-reduced audio. In some embodiments, the processing circuitry may enhance voice content, relative to non-voice content.

This time-resolved output is transmitted, via an output port 118, to an external device 120 configured to receive the time-resolved output 116.

As referred to herein, a "time-resolved" signal may refer to a signal which has resolution in time. However, it does not necessarily mean that all time-resolved signals referred to as such necessarily have the same resolution in time. For example, in some cases an input digital signal at a given sample rate may be intermittently processed to generate a processed digital signal stream with a lower sample rate, e.g. to reduce computational cost.

In various embodiments, the output port 118 may be a physical port allowing electrical communication between the noise-reduction microphone 100 and the external device 120 via a cable 124.

In various embodiments, the external device 120 may be a speaker, a computing device, and/or a communication device.

A dial 122 or other input device in operable electrical communication with the processing circuitry may be operated by a user to control an amount of noise reduction performed by the noise-reduction microphone 100.

In some embodiments, the noise-reduction microphone 100 may generate a single-source signal. The single-source signal may be generated from a single transducer, multiple transducers that are not spatially distinguishable from each other, and/or multiple transducers not distinguished from each other for the purpose of processing, even if they are spatially distinguishable from each other. In some embodiments, a single-source signal may be generated from multiple signals by averaging.

Advantages may accrue from using single-source signals. Example advantages may include lower design and implementation complexity, computational efficiency, and/or lower costs.

Figure 2:
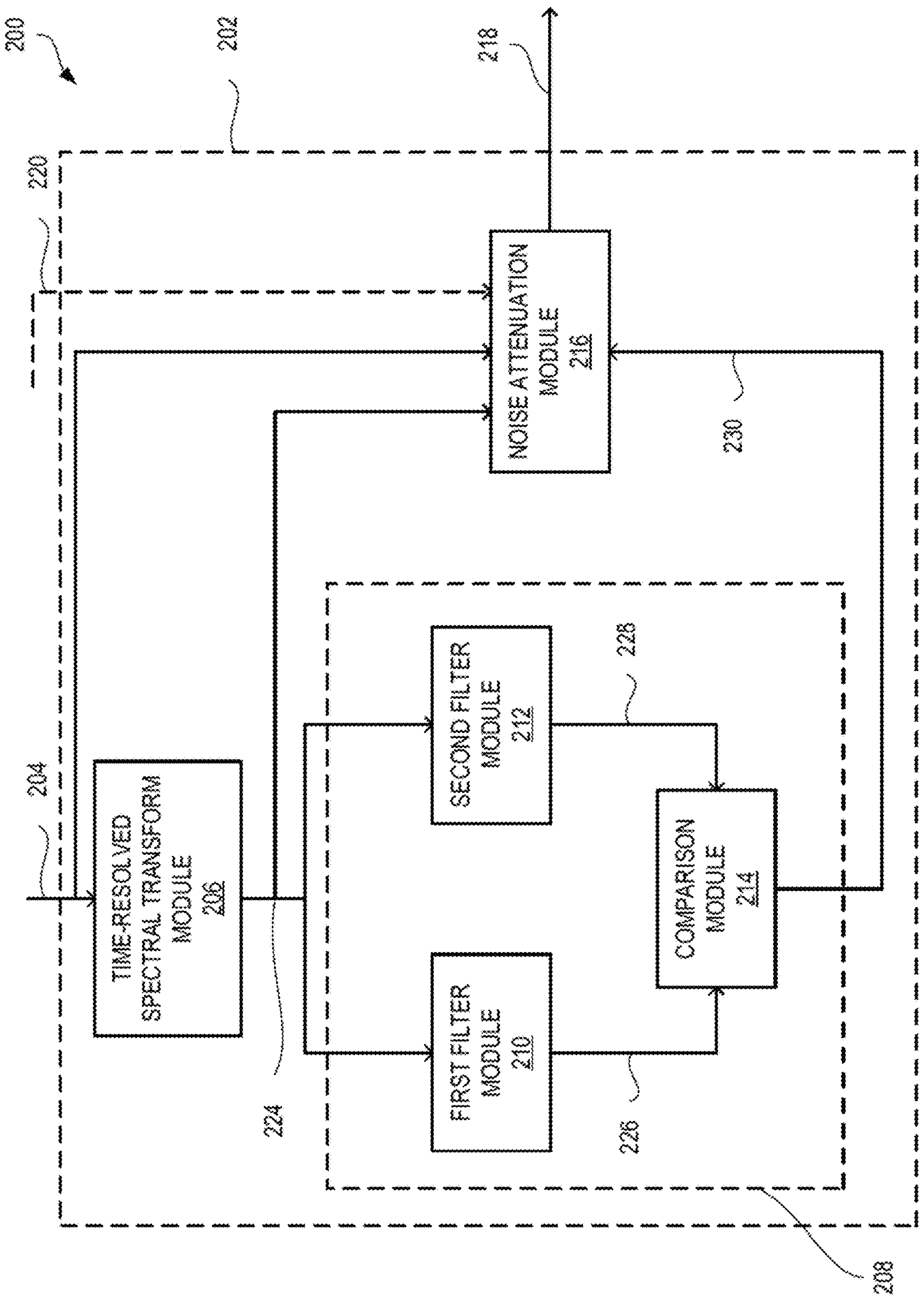
FIG. 2 is a schematic block diagram of processing circuitry of a noise reduction system for enhancing voice content relative to non-voice content, in accordance with an embodiment.

FIG. 2 is a schematic block diagram 200 of processing circuitry 202 of a noise reduction system for enhancing voice content relative to non-voice content, in accordance with an embodiment.

Processing circuitry 202 may include digital and/or analog devices, e.g. digital signal processors (DSP), field-programmable gate array (FPGA), microprocessors, other types of circuits including various integrated circuits, and/or memory (transitory and/or non-transitory, or non-volatile) with instructions stored thereon. For example, processing circuitry 202 may be configured as a real-time system.

In some embodiments, processing circuitry 202 may configured for low energy consumption and for operation at low voltages. In some embodiments, processing circuitry 202 may consume less than 5 W or less than 2.5 W in some cases. In various embodiments, the processing circuitry 202 may be operable using power delivered via a USB 1.0, USB 2.0, and/or USB 3.0 connection. In various embodiments, low energy consumption constraints may put lower limits on achievable latency, e.g. due to lower processing power available.

A time-resolved spectral transform module 206 may receive a time-resolved signal 204 (i.e. a signal having resolution in time, time-varying or not) indicative of audio. For example, the time-resolved signal 204 may be a single-source, microphone-generated signal.

A time-resolved spectral transform module 206 may be configured to generate time-resolved spectral data 224 using temporally localized spectral representations of the time-resolved signal 204.

Spectral components may indicate Fourier frequency components, but are not necessarily limited to Fourier frequency components. For example, spectral components may include components corresponding to wavelet scale factors.

In various embodiments, temporally localized spectral representations may include (temporally localized) short-time Fourier transforms (STFTs, including those implemented using the FFT), such as Gabor transforms, sliding discrete Fourier transforms, continuous wavelet transforms (CWTs, including in discrete forms), S-transforms (including fast S-transforms), warped FFTs, and other time-frequency representations (TFRs).

For example, the continuous STFT X(τ, ω) of a signal x(t) may be $$X(\tau, \omega) = \int_{-\infty}^{\infty} x(t) w(t - \tau) e^{-i\omega t} dt$$

where τ represents temporal localization, ω represents spectral or frequency (or scale) localization, and w(t−τ) is a window function centred at τ. In various embodiments, window functions may include boxcar window, triangular windows, Hann window, Hamming window, sine window, and/or other types of windows.

As another example, the continuous wavelet transform (CWT) is given by $$X_w(f, \tau)|f|^{\frac{1}{2}} \int_{-\infty}^{\infty} x(t)\psi((t - \tau) \cdot f) dt$$

where ψ(•) is the complex conjugate of the mother wavelet function, ƒ is the inverse scale factor that represents inverse scale (or spectral) localization, and τ is the translation value that represents temporal localization.

For implementation using digital circuits, discrete versions of the above transforms may be used, e.g. the discrete-time STFT given by $$X(t_m, \omega) = \sum_{n=-\infty}^{\infty} x[t_n] w[t_n - t_m] e^{-i\omega t_n}$$

where $t_k$ for integer k represents discrete time.

In some embodiments, it is found to be particularly advantageous to rely on window functions remove parts of the signal outside of a duration of interest, centred around the time step chosen for temporal localization, and to then use the Fast Fourier Transform (FFT) to efficiently obtain temporally localized spectral representations based on the duration of interest. For example, low latency and high computational efficiency may be achieved. In various embodiments, lengths of the durations of interest may be between 125 ms and 0.6 ms, and may be at least large enough to capture the frequencies of interest. In some embodiments, it is found advantageous to use a window length between 2 ms and 8 ms, and in particular between 5-6 ms, e.g. 5.33 ms.

In some embodiments, an input audio signal is a digital signal having a sample rate less that 100 kHz and/or greater than 50 kHz, e.g. 96 KHz. An FFT may be used with a length, and/or a window length, of between 64 and 4096 samples, e.g. 512, 256, 64, or other $2^n$ sample sizes (for various n). The length of the FFT may be adjusted to achieve a desired latency. For example, it is found to be particularly advantageous to have a window length of 5.33 ms corresponding to 512 samples at approximately 96 KHz.

In some embodiments, the spectral calculation may be updated at regular intervals, e.g. the time resolution of the spectral data may be different than that of an input signal. For example, in some embodiments, for an input audio signal with sample rate 96 kHz, an FFT may be updated every 128 sample sizes to achieve a time-resolution of 750 Hz. The FFT length may be 512 samples, and therefore an overlap of 384 samples may be achieved for each re-calculated FFT.

In various embodiments, noise or non-voice components may have frequencies in the range 50 Hz-10 KHz and voice components may have frequencies in the range 50 Hz-7 kHz. In various embodiments, noise or non-voice components may spectrally overlap with voice components. For example, in some embodiments a tone generator in any frequency range overlapping with the voice components may be removed by aspects of noise reduction systems disclosed herein.

The time-resolved spectral data 224 may include data describing the temporal evolution of each spectral component. In various embodiments, spectral components may be wholly real, imaginary, or complex.

In some embodiments, the time-resolved spectral data 224 may include a plurality of data vectors, each data vector associated with a corresponding spectral component and representing a corresponding time-series describing the temporal evolution of that spectral component or some quantity indicative thereof. For example, each data vector may describe temporal evolution of the magnitude, squared magnitude, $L_p$ norm, or other function of a corresponding spectral component. Such functions may be chosen to sufficiently represent the temporal evolution of the corresponding spectral component. For example, non-representative functions may be excluded.

The time-resolved spectral data 224 may be received by a first filter module 210 and a second filter module 212 configured to generate, respectively, first filtered data 226 and second filtered data 228.

In various embodiments, the first filtered data 226 and second filtered data 228 may be formed by attenuating temporal variations of the time-resolved spectral data 224 based on, respectively, a first timescale and a second timescale. The second timescale may be different than the first timescale.

At least one of the timescales may be based on a characteristic timescale of the spectrum of the voice content, whereas the other timescale may be relatively much longer in comparison thereto yet shorter than a characteristic timescale of the spectrum of the non-voice content. In some embodiments, the shorter of the first and second timescales may be associated with and/or based on a timescale of the voice content.

For example, the first filtered data 226 and second filtered data 228 may exclude parts of the time-resolved spectral data 224 which vary over timescales shorter than, respectively, the first timescale and the second timescale. Such variation may be quantified using additional Fourier transforms, wavelet transforms, or other methods. In various embodiments, exclusion of such variations in the time-resolved spectral data 224 may accomplished efficiently using appropriately tuned linear filters.

In some embodiments, the first timescale may be representative of a timescale over which variations in the voice spectrum occur, while the second timescale may be much longer than such a timescale while being shorter than a timescale over which variations in the noise spectrum occur.

In some embodiments, the first timescale may be greater than the second timescale.

In some embodiments, the non-voice content is noise with a spectrum that is stationary or slowly varying relative to at least one of the first timescale or the second timescale. For example, a signal that is slowly varying relative to a particular timescale may refer to a signal that does not change appreciably over a period of time corresponding to that particular timescale.

In some embodiments, the first filtered data 226 and second filtered data 228 may be generated by passing the time-resolved spectral data 224 through, respectively, a first low-pass filter and a second low-pass filter. The first low-pass filter and a second low-pass filter may define, respectively, a first time constant and a second time constant.

In some embodiments, it is found particularly advantageous to use first-order low-pass filters. The first filter module 210 and the second filter module 212 may define corresponding filters with respective transfer functions $H_1(s)$ and $H_2(s)$, given by $$H_k(s) = \frac{1}{\tau_k s + 1} k = 1, 2$$

where $\tau_1$ is the first time constant and $\tau_2$ is the second time constant. For example, low latency may be thereby achieved.

In some embodiments, it may be found advantageous to utilize an IIR filter (infinite impulse response filter). In some embodiments, an FIR filter may be used (finite impulse response filter).

In some embodiments, the first time constant and the second time constants may be associated with, respectively, the first timescale and the second timescale. In some embodiments, the first time constant and the second time constants may coincide with, respectively, the first timescale and the second timescale.

The first filtered data 226 and the second filtered data 228 may be fed into a comparison module 214. The comparison module 214 may determine whether voice is detected or not by comparing the first filtered data 226 and the second filtered data 228. The first filter module 210, the second filter module 212, and the comparison module 214 may together form a voice activity detection module or VAD module 208.

In some embodiments, the comparison module 214 evaluates the deviation of the first filtered data 226 and the second filtered data 228 away from each other for each spectral component represented in the time-resolved spectral data 224. In various embodiments, such a deviation may take the form of a metric distance between the first filtered data 226 and the second filtered data 228, such as an $L_p$ norm. In some embodiments, the squared magnitude of the difference between the first filtered data 226 and the second filtered data 228 is found to be particularly effective.

$$d_{L_2}(t,\omega;A_1,A_2)=|A_1(t,\omega)-A_2(t,\omega)|^2$$

where $A_1$ and $A_2$ represent, respectively, the first filtered data 226 and the second filtered data 228.

The deviation $d_{L_2}(t, \omega; A_1, A_2)$ may be reduced to a scalar quantity for evaluation and comparison to a predetermined detection threshold. For example, an average deviation may be considered by summing over time and all the spectral components, i.e.

$$\overline{d_{L_2}}(A_1, A_2) = \frac{1}{N_T N_\Omega} \sum_{t \in T} \sum_{\omega \in \Omega} d_{L_2}(t, \omega; A_1, A_2)$$

where $N_T$ and $N_\Omega$ are the number of time-steps in duration T and spectral components in spectral space Ω, respectively. Here the duration T is the size of the window and/or length of the time window under consideration (e.g. proportional to the length of the FFT). For example, at each time τ, a separate duration of time T may be considered.

In some embodiments, a frequency-weighted average of distances between the first filtered data and the second filtered data may be used to obtain a scalar quantity for evaluation, where the distances associated with corresponding spectral components represented in the time-resolved spectral data, i.e.

$$\widetilde{d_{L_2}}(A_1, A_2) = \frac{1}{N_T \sum_{\omega \in \Omega} \omega} \sum_{t \in T} \sum_{\omega \in \Omega} \omega \cdot d_{L_2}(t, \omega; A_1, A_2).$$

The comparison module 214 may compare the frequency-weighted average to a predetermined detection threshold to determine if voice is present or not. For example, if the frequency-weighted average of the deviation is greater than the predetermined detection threshold, the comparison module 214 may determine that voice is detected.

In various embodiments, the comparison module 214 may carry out additional normalizations and/or scaling of the the first filtered data 226 and the second filtered data 228 prior to evaluation against a or the predetermined detection threshold, e.g. to re-scale a signal amplitude (overall spectral energy).

In various embodiments, the comparison module 214 may generate time-resolved detection data 230 indicative of detection of voice.

In some embodiments, the time-resolved detection data 230 is indicative of a Boolean variable representing whether voice is detected in the time-resolved signal or not. In some embodiments, the time-resolved detection data 230 is not a Boolean variable, e.g. it may be determined using the frequency-weighted average mentioned above. In such cases, the time-resolved detection data 230 may be taken to be representative of a quantity proportional to the probability of voice detection or the amount of voice relative to noise.

In an exemplary embodiment, the first filtered data $A_1$ is first-order low-pass filtered data based on a time constant of about 2 seconds (slow filter; long time constant) and the second filtered data $A_2$ is first-order low-pass filtered data based on a time constant of about ¼ seconds (fast filter; short time constant). Such a configuration is found particularly advantageous for human voices and to filter out common noises, such as those of fans.

An example of values obtained using such filters is shown in Table 1 below.

TABLE 1

| | $\widetilde{d_{L_2}}$ (A1, A2) | $\widetilde{E(A_1)}$ | $\widetilde{E(A_2)}$ | S(A1, A2) | S(A2, A1) |
|---|---|---|---|---|---|
| Baseline | $9.41 \times 10^{-15}$ | $2.89 \times 10^{-13}$ | $2.45 \times 10^{-13}$ | 30.7 | 26.1 |
| Fan | $3.65 \times 10^{-13}$ | $1.98 \times 10^{-9}$ | $1.94 \times 10^{-9}$ | 5409.9 | 5310.5 |
| Speech | $3.70 \times 10^{-5}$ | $1.9 \times 10^{-3}$ | $2.4 \times 10^{-3}$ | 50.1 | 65.0 |

where $\widetilde{E(X)}$ is the frequency-weighted average energy of X, as given below $$\widetilde{E(X)} = \frac{1}{N_T \sum_{\omega \in \Omega} \omega} \sum_{t \in T} \sum_{\omega \in \Omega} \omega \cdot d_{L_2}(t, \omega; X, 0),$$

$S(X_1, X_2)$ is a normalized frequency-weighted average energy of $X_1$, given by $$S(X_1 X_2) = \frac{\widetilde{E(X)}}{\widetilde{d_{L_2}}(X_1, X_2)},$$

and the frequency set @ is as follows $$\omega = \{0.99^n | n = 0, \ldots, N-1\},$$

where, e.g., N=512.

In some embodiments, "baseline" may generally refer to silence and/or absence of fan noise and/or speech.

In some embodiments, the voice activity detector threshold (predetermined detection threshold) is $$\lambda = \frac{10^{-7}}{N_T \sum_{\omega \in \Omega} \omega} = 4.23 \times 10^{-12}.$$

Thus, for example, at each time τ, the detection data may be Boolean-valued function, as follows $$\text{detection} = \begin{cases} 1; & \widetilde{d_{L_2}}(A_1, A_2) \geq \lambda \\ 0; & \widetilde{d_{L_2}}(A_1, A_2) < \lambda \end{cases}.$$

For example, in some exemplary embodiments, the predetermined detection threshold may be between 14-17 times the baseline frequency-weighted energy $\widetilde{E(A_2)}$ or $\widetilde{E(A_2)}$. In some embodiments, the fan condition energy $\widetilde{E(A_1)}$ or $\widetilde{E(A_2)}$ may be 400-500 (or 450) times greater than λ.

In various embodiments, the detection data may be resolved in time. In some embodiments, the resolution of the detection data may be less than the input signal resolution. In some embodiments, the resolution may correspond to the temporal resolution of the spectral data. For example, in some embodiments, the spectral data may be sub-resolved relative to the input signal data.

In various embodiments, the first timescale is greater than the second timescale, and a spectrum of the non-voice content varies over a timescale greater than the second timescale such that the percentage $100\times(\widetilde{d_{L_2}}(A_1, A_2)/\widetilde{E(A_1)})$ may be at most 0.1%, 0.5%, or 1%, or less than 0.1%.

An example based on Table 1 is shown in Table 2 below.

TABLE 2

| | $100\times(\widetilde{d_{L_2}}(A_1, A_2)/\widetilde{E(A_1)})$ | $\widetilde{d_{L_2}}$ $(A_1, A_2)$ | $\widetilde{E(A_1)}$ |
|---|---|---|---|
| Baseline | 3.25% | $9.41 \times 10^{-15}$ | $2.89 \times 10^{-13}$ |
| Fan | 0.0184% | $3.65 \times 10^{-13}$ | $1.98 \times 10^{-9}$ |
| Speech | 1.95% | $3.70 \times 10^{-5}$ | $1.9 \times 10^{-3}$ |

For example, in some embodiments, a frequency-weighted sum of squared differences, over frequencies associated with voice and non-voice content, between components of a time-average of the spectrum of the non-voice content over the first timescale and components of a time-average of the spectrum of the non-voice content over the second timescale is at most 0.001% of a frequency-weighted sum of squares of components of a time-average of the spectrum of the non-voice content over the first timescale.

In some embodiments, smoothening algorithms and processing methods may be used to smoothen temporal variations in the time-resolved detection data 230.

In some embodiments, when the time-resolved detection data 230 is a Boolean variable, the time-resolved detection data 230 may not be filtered. For example, in some embodiments, the time-resolved detection data 230 may be an on/off signal to turn a first-order filter 312 on or off, e.g. to estimate noise (or not).

A noise attenuation module 215 may receive and process the time-resolved signal 204 to attenuate non-voice content relative to voice content based on determined detection of voice.

The time-resolved detection data 230 may be supplied to the noise attenuation module 215 to generate thereby a time-resolved output 218 indicative of noise-reduced audio.

In some embodiments, the time-resolved detection data 230 may be used by the noise attenuation module 215 to attenuate non-voice content relative to voice content, e.g. by calculating a spectral gain for attenuation.

In some embodiments, the noise attenuation module 215 may attenuate the time-resolved signal 204 in terms of total energy and/or within certain frequencies when no voice is detected.

In some embodiments, the noise attenuation module 215 may carry out spectral subtraction of noise from the time-resolved signal 204 when voice is detected, including by using time-resolved spectral data 224 provided by the time-resolved spectral transform module 206.

In some embodiments, the noise attenuation module 215 may generate a noise estimate by low pass filtering the time-resolved spectral data 224 when no voice activity is detected. This noise estimate may be used to determine a spectral gain for noise reduction. Such noise estimates may be used for spectral subtraction or in other methods of noise reduction.

In some embodiments, attenuation is carried out only when voice is not detected. In some embodiments, when voice is detected, the time-resolved signal 204 is not processed or processed in a manner to preserve its characteristics, i.e. without any substantial noise reduction.

In some embodiments, the noise attenuation module 216 may be configured to receive a user-generated signal 220 indicative of an amount of noise reduction that is desired. The noise attenuation module 216 may modify the noise attenuation based on the user-generated signal 220.

In some embodiments, the noise attenuation module 216 applies an adjustment gain to modify the noise attenuation. In some embodiments, the noise attenuation module 216 applies an adjustment gain to the time-resolved detection data 230 based on the user-generated signal 220.

Figure 3:
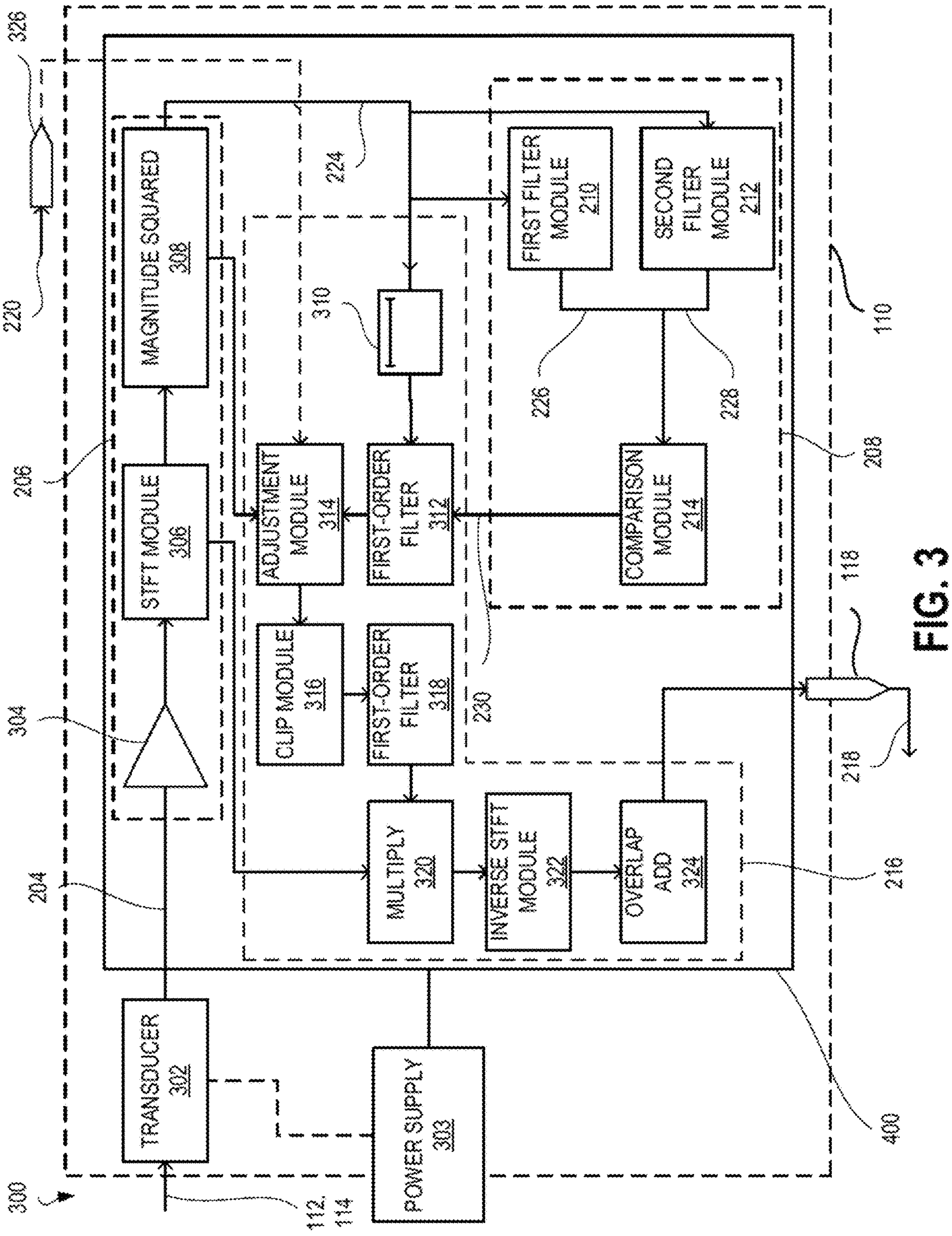
FIG. 3 is a schematic block diagram of a noise reduction system for enhancing voice content relative to non-voice content, in accordance with another embodiment.

FIG. 3 is a schematic block diagram 300 of a noise reduction system for enhancing voice content relative to non-voice content, in accordance with another embodiment.

A transducer 302 (electrical transducer) may be coupled to a power supply 303 for receiving power therefrom and may generate the time-resolved signal 204, which may be fed to the time-resolved spectral transform module 206.

The noise reduction system may be implemented on a computing device 400 powered by the power supply 303. For example, a processor or processing circuits may be operably coupled to the power supply 303.

The time-resolved spectral transform module 206 may include a buffer 304, which may feed a Short-time Fourier transform module or STFT module 306. The buffer 304 may include sufficient data for the STFT, e.g. based on a sample rate (ensemble size) and/or hop size.

The STFT module may be implemented using a Fast Fourier Transform (FFT) and a window function. For example, a width of the window function may be about 5.33 ms.

The spectrum generated by the STFT module 306 may be fed into the magnitude squared block 308 to extract, frequency-by-frequency (spectral component-by-component), the squared magnitude of each frequency (or component).

In the VAD module 208, the first filter module 210 may include a first-order low-pass filter with a first time constant, and the second filter module 212 may include a first-order low-pass filter with a second time constant.

The noise attenuation module 216 may be configured to receive the time-resolved spectral data 224, to be fed into a delay module 310, and the time-resolved detection data 230. The noise attenuation module 216 may compute a spectral gain and use this to obtain noise-reduced output.

When the time-resolved detection data 230 indicates absence of voice, the noise attenuation module 216 may be configured to update a noise estimate using the time-resolved spectral data 224. It is found particularly advantageous to place the delay module 310 to filter out transient onsets when estimating noise.

The first-order filter 312 may be a noise estimation filter configured to generate an estimate of the noise when the first-order filter 312 is turned on.

An updated noise estimate may be fed to the adjustment module 314 via the first-order filter 312. The adjustment module 314 may compute a gain G (ω) for each frequency ω (spectral gain) as follows $$G(\omega) = 1 - \frac{\alpha \cdot |\text{spectral component } \omega \text{ of the noise estimate}|^2}{|\text{spectral component } \omega \text{ of the time} - \text{resolved signal}|^2}$$

where $\alpha \in [0,1]$ is a value determined based on a user-generated signal 220 received via a user input port 326, e.g. via a dial such as the dial 122. For example, the larger the value of a the stronger the noise reduction.

The output spectral gain is clipped in the clip module 316 to restrict G(ω) between 0 and 1 to achieve a well-defined gain $G_{ct}(\omega)$. The clipped spectral gain $G_{ct}(\omega)$ is passed through a first-order filter 318, e.g. a low-pass filter, to achieve smoothing of the gain signal.

The spectral gain is applied to the time-resolved spectral data 224 via multiplication in a multiplication block 320.

Once the spectral gain is applied to each frequency component, the time-domain signal is retrieved via the inverse STFT module 322.

An overlap-add module 324 is provided to receive the time-domain signal, and the time-resolved output 218 is transmitted out via the output port 118.

In various embodiments, the transducer 302 and the computing device 400 may be housed within the same housing 110.

In some embodiments, the time-resolved detection data 230 is filtered using a low-pass filter after applying the adjustment gain to smoothen temporal variations in the time-resolved detection data 230, e.g. including first-order low-pass filtering with a time constant of less than 10 seconds.

Figure 4:
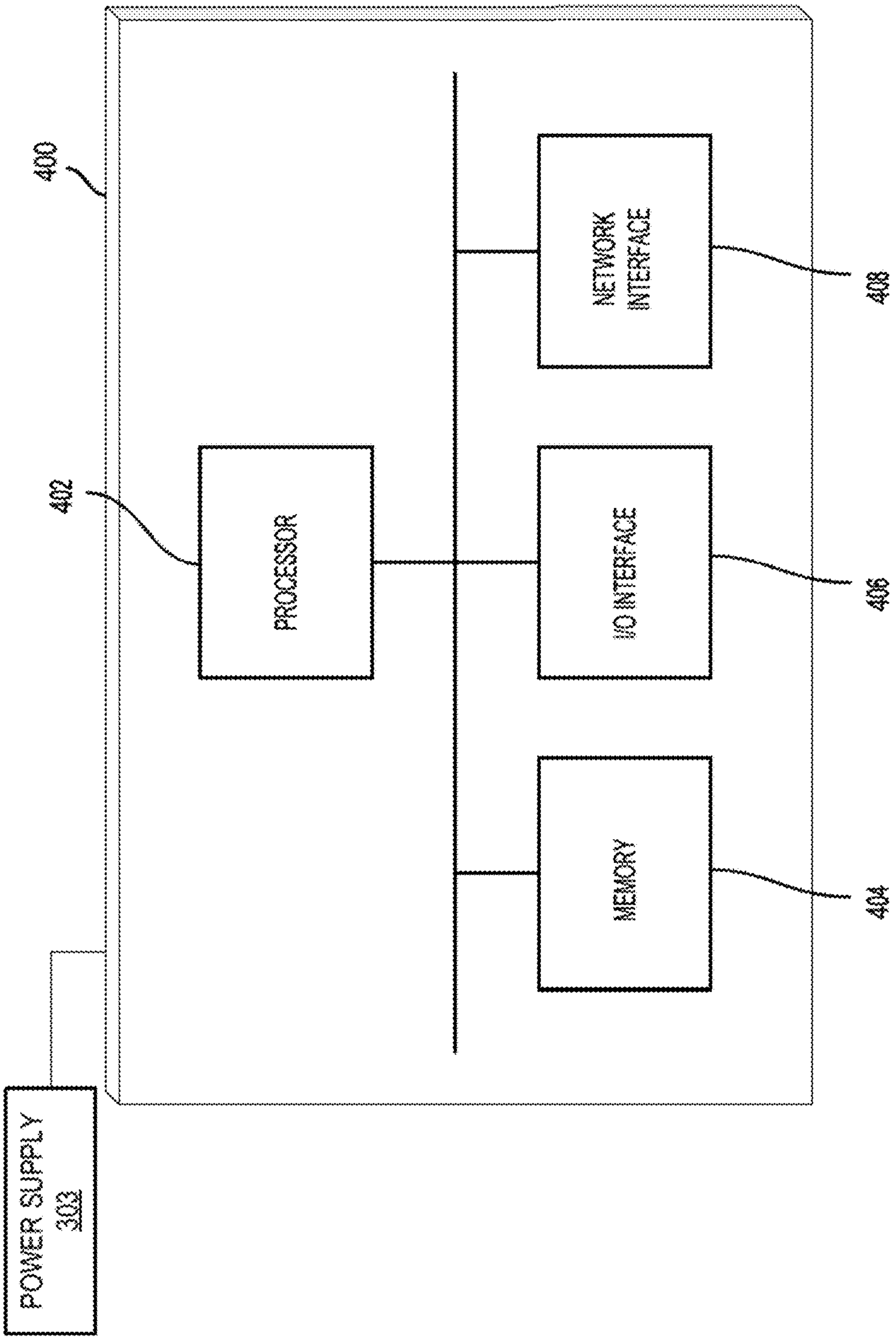
FIG. 4 is schematic block diagram of a computing device, in accordance with an embodiment.

FIG. 4 is schematic block diagram of the computing device 400, in accordance with an embodiment. For example, the aforementioned noise reduction systems and processing circuitry may be implemented using the computing device 400.

In various embodiments, the computing device 400 may include one or more processors 402, memory 404, one or more I/O interfaces 406, and one or more network communication interfaces 408.

In various embodiments, the processor 402 may be a microprocessor or microcontroller, a digital signal processing (DSP) processor, an integrated circuit, a field programmable gate array (FPGA), a reconfigurable processor, a programmable read-only memory (PROM), or combinations thereof.

In various embodiments, the memory 404 may include a computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM).

In some embodiments, the I/O interface 406 may enable the computing device 400 to interconnect with one or more input devices, such as a keyboard, mouse, camera, touch screen and a microphone, or with one or more output devices such as a display screen and a speaker.

In some embodiments, the networking interface 408 may be configured to receive and data, e.g. as data structures (such as vectors and arrays). The target data storage or data structure may, in some embodiments, reside on a computing device or system such as a mobile device.

The term “connected” or “coupled to” may include both direct coupling (in which two elements that are coupled to each other contact each other) and indirect coupling (in which at least one additional element is located between the two elements).

Figure 5:
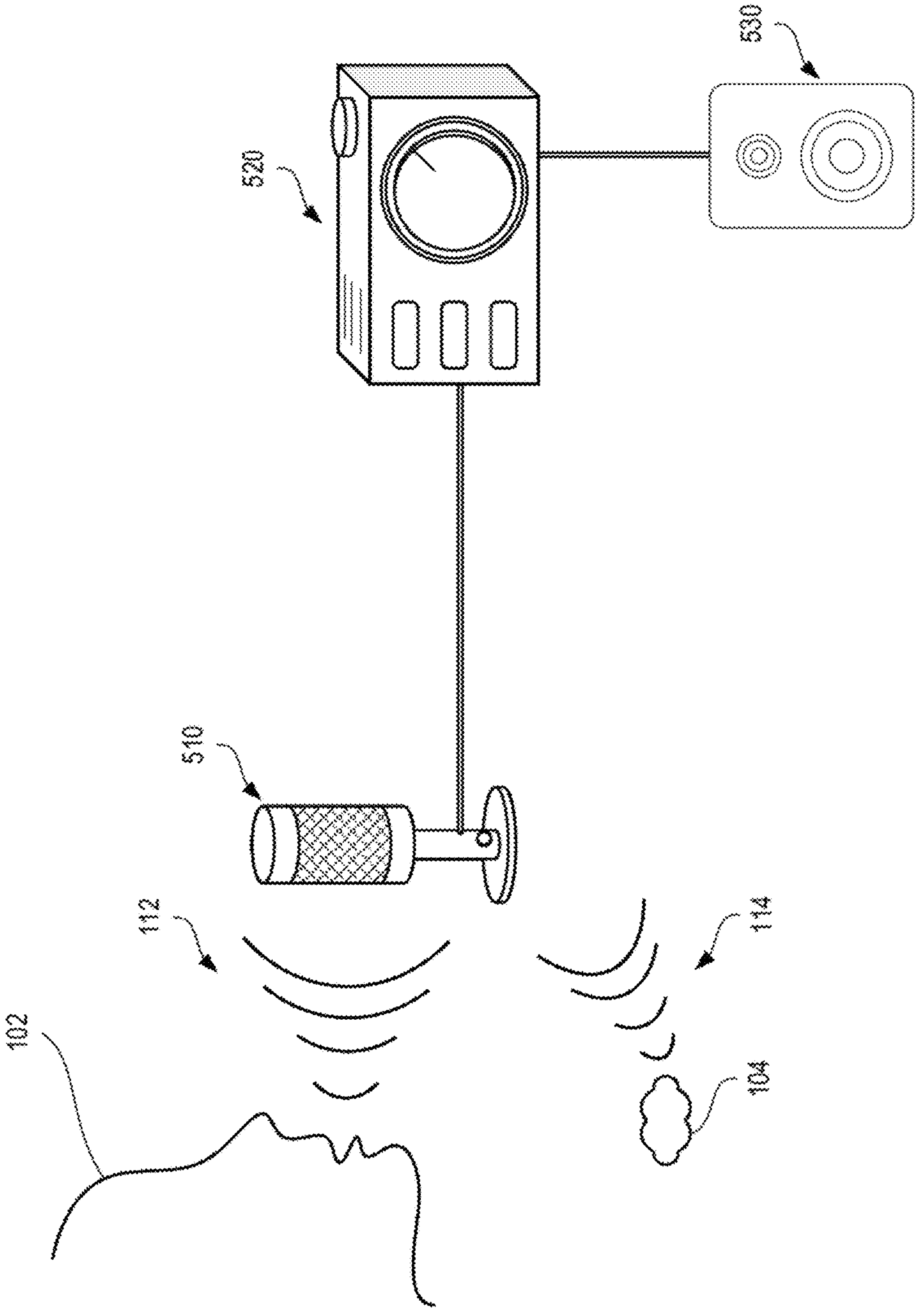
FIG. 5 is a schematic view of a noise reduction system particularly adapted for human speech, in accordance with an embodiment.

FIG. 5 is a schematic view of a noise reduction system 500 particularly adapted for human speech, in accordance with an embodiment.

The noise reduction system 500 may comprise a microphone 510 for generating time-resolved signals indicative of audio. The microphone 510 may be a microphone without noise reduction capabilities. The microphone 510 may be coupled to an external noise reduction device 520, which may include processing circuitry for noise reduction. For example, the processing circuitry of the external noise reduction device 520 may correspond to the computing device 400. An audio output device, such as a speaker 530, may be provided to output noise-reduced audio received from the external noise reduction device 520.

In some embodiments, the external noise reduction device 520 may implement a Fast Fourier Transform (FFT) of size 512 running at 96 kHz, producing a latency of 512 samples (about 5.3 ms).

In some embodiments, the external noise reduction device 520 may substantially implement the noise reduction system shown in the schematic block diagram 300. The first filter module 210 may implement a low-pass filter with a time constant of 100 ms, and may be the fast time constant filter module. The time constant may be defined as the time the low-pass filter takes to adapt from the starting value to 90% of the target value. The second filter module 212 may implement a low-pass filter with a time constant of 2000 ms, and may be the slow time constant filter module. The first-order filter 312 adapting or conditioning the noise spectrum may have an associated time constant of 1000 ms. The first-order filter 318 adapting or conditioning the spectral gain may have an associated time constant of 100 ms. Such parameters may be advantageous for detecting human voice(s) compared to other methods.

The external noise reduction device 520 may be configured for convenient plug and play operation, and may be configured to connect to a generic audio input to provide a generic audio output. For example, efficient, low latency, and low power consumption noise cancellation may be achieved.

Figure 6:
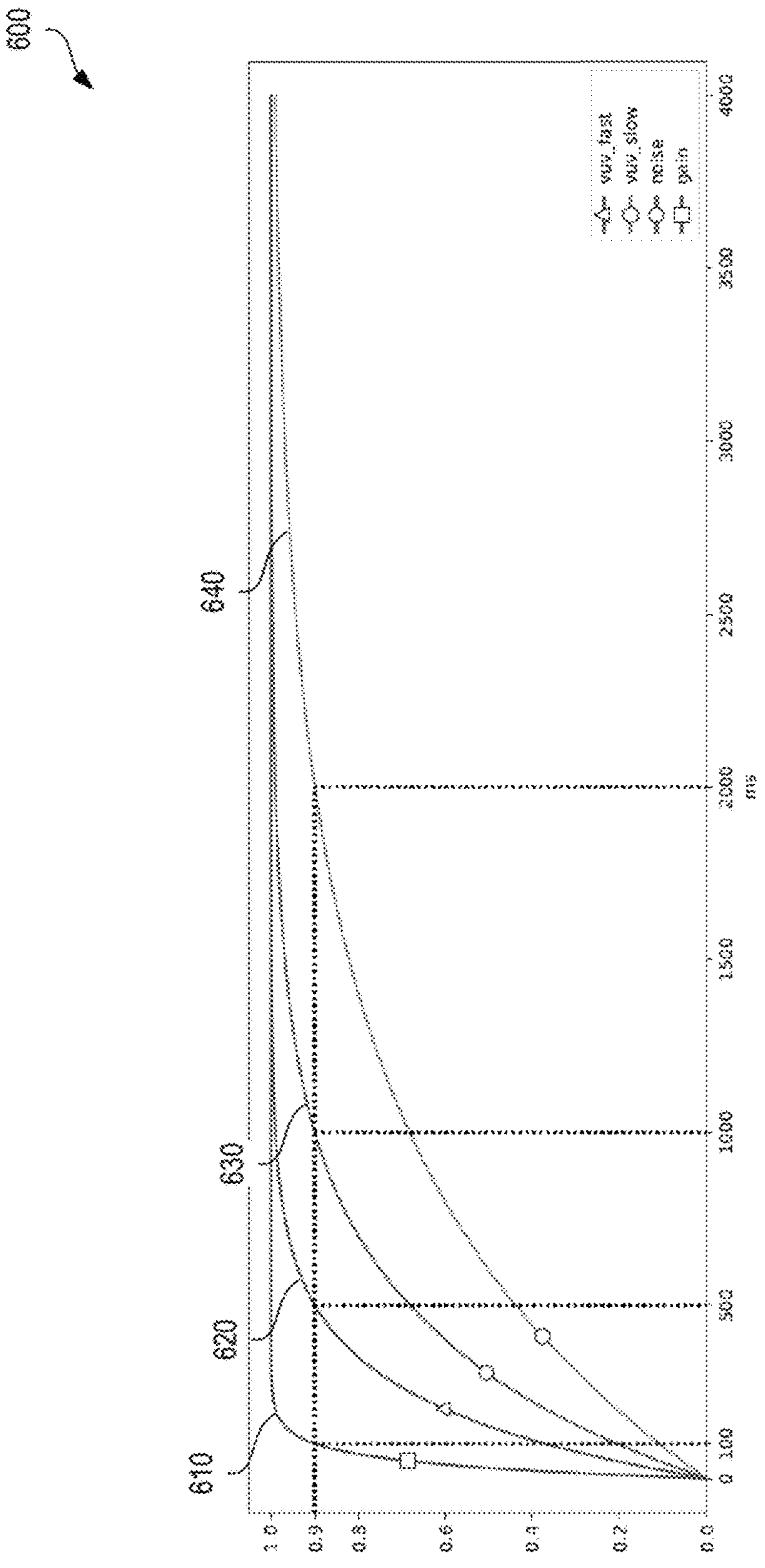
FIG. 6 is a chart of step responses of various first-order (low-pass) filters used in an external noise reduction device, in accordance with an embodiment.

FIG. 6 is a chart 600 of step responses of various first-order (low-pass) filters used in the external noise reduction device 520, in accordance with an embodiment.

The line plot 610 is an exemplary step response of the first-order filter 318.

The line plot 620 is an exemplary step response of the first filter module 210 (small time constant or fast response).

The line plot 640 is an exemplary step response of the second filter module 212 (large time constant or slow response).

The line plot 630 is an exemplary step response of the first-order filter 312.

The first-order filters are selected to advantageously facilitate noise cancellation when the voice is a human voice.

The cut-off timescales are generally represented by the dotted lines.

Figure 7:
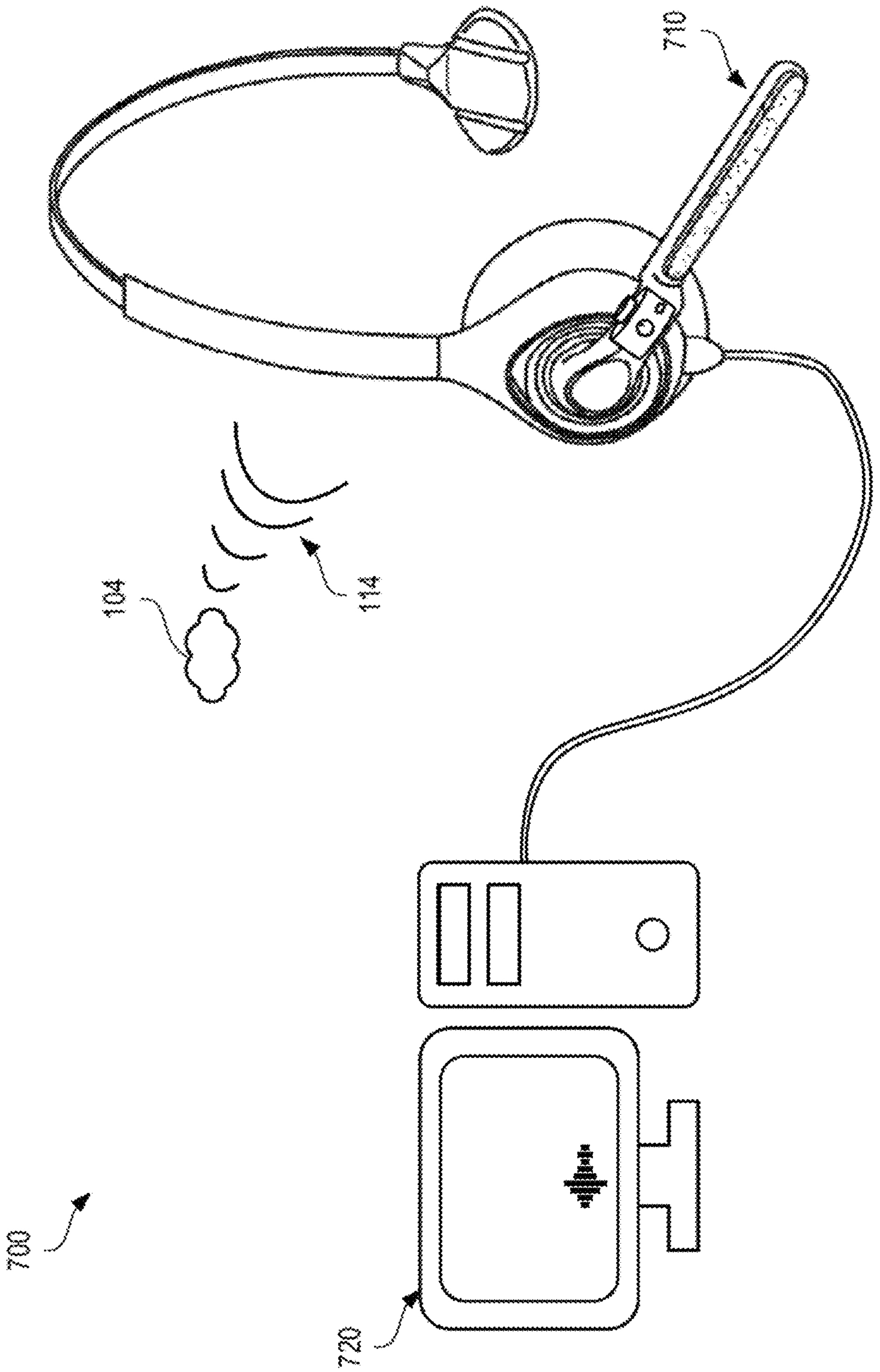
FIG. 7 is schematic of a noise reduction system, in accordance with an embodiment.

FIG. 7 is schematic of a noise reduction system 700, in accordance with an embodiment.

The noise reduction system 700 may be implemented on an external computing device, which may be the end device. For example, in some embodiments, a microphone 710 may generate audio signals, which may then be transmitted via cable to a desktop computer 720, which may be the end device. The desktop computer 720 which may be configured similarly to the computing device 400 may execute machine-readable instructions to cause noise reduction.

Figure 8:
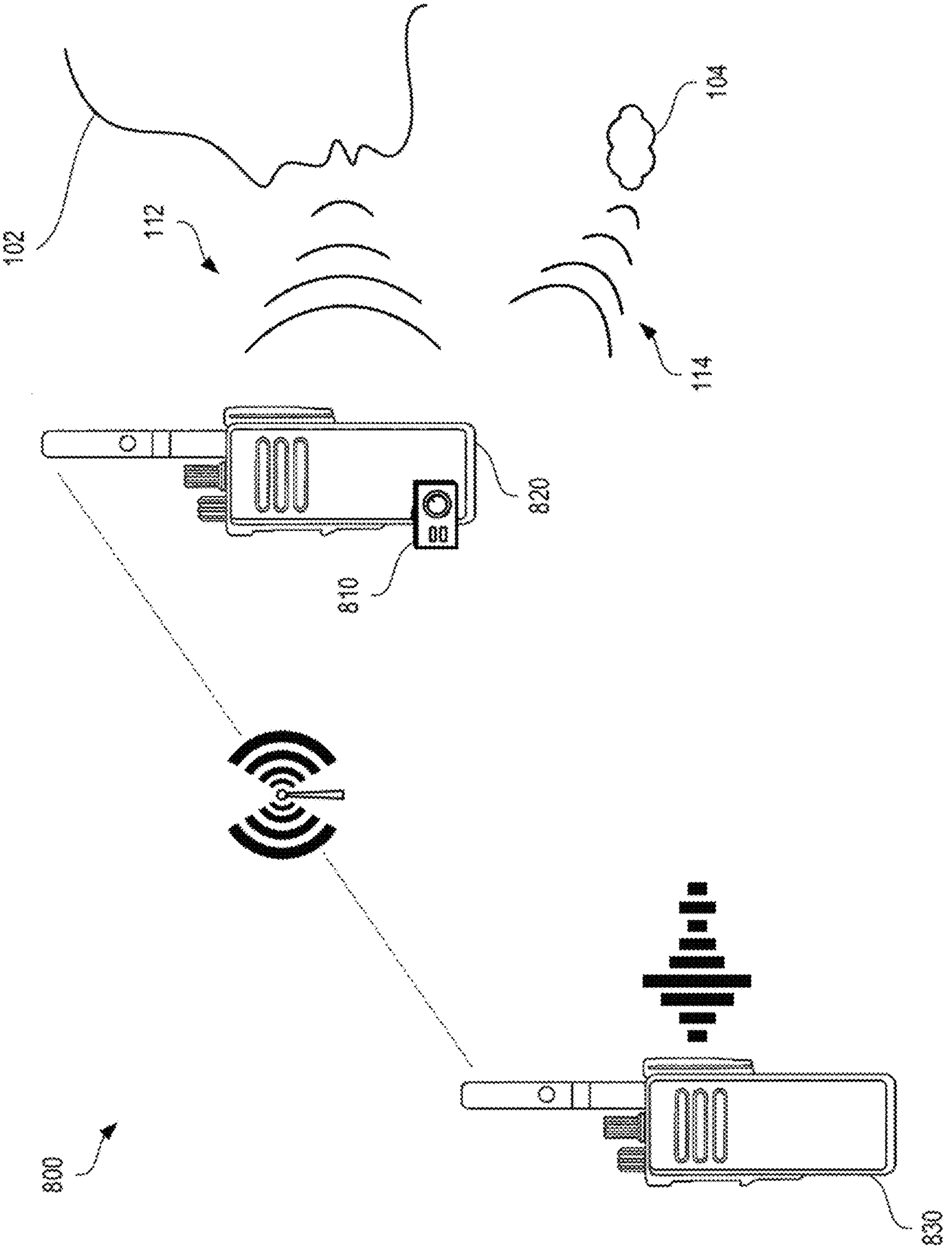
FIG. 8 is schematic of a noise reduction system, in accordance with yet another embodiment.

FIG. 8 is schematic of a noise reduction system 800, in accordance with an embodiment.

A first wireless communication device 820 may be in wireless communication with a second wireless communication device 830. The first wireless communication device 820 may be in electrical communication with a noise reduction device 810 to reduce noise in captured audio prior to wireless transmission to the second wireless communication device 830. For example, the noise reduction device 810 may be similar the external noise reduction device 520.

Figure 9:
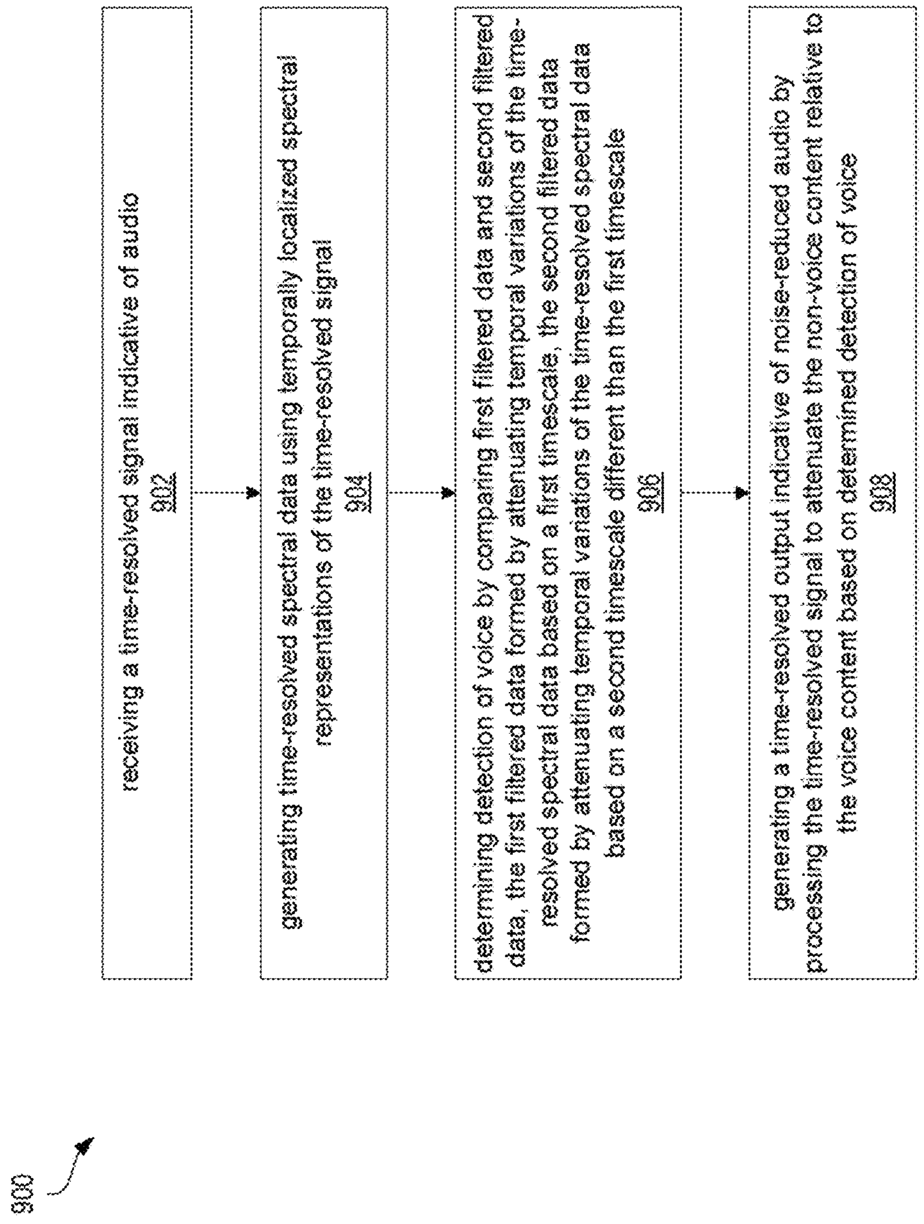
FIG. 9 is a flow chart of a method of real-time noise reduction for audio signals to enhance, with low latency, voice content relative to non-voice content of the audio signals, in accordance with an embodiment.

FIG. 9 is a flow chart of a method 900 of real-time noise reduction for audio signals to enhance, with low latency, voice content relative to non-voice content of the audio signals, in accordance with an embodiment.

At step 902, the method 900 includes receiving a time-resolved signal indicative of audio.

At step 904, the method 900 includes generating time-resolved spectral data using temporally localized spectral representations of the time-resolved signal.

At step 906, the method 900 includes determining detection of voice by comparing first filtered data and second filtered data, the first filtered data formed by attenuating temporal variations of the time-resolved spectral data based on a first timescale, the second filtered data formed by attenuating temporal variations of the time-resolved spectral data based on a second timescale different than the first timescale.

At step 908, the method 900 includes generating a time-resolved output indicative of noise-reduced audio by processing the time-resolved signal to attenuate the non-voice content relative to the voice content based on determined detection of voice.

In some embodiments, there may be provided non-transitory computer-readable medium or media having stored thereon machine interpretable instructions which, when executed by a processor of a computing device, cause the processor to perform the method 900. For example, the processor may be part of the computing device 400.

As can be understood, the examples described above and illustrated are intended to be exemplary only.

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the embodiments are intended to include within their scope such processes, machines, manufacture, compositions of matter, means, methods, or steps.

What is claimed is:

1. A method of real-time noise reduction for audio signals to enhance, with low latency, voice content relative to non-voice content of the audio signals, comprising:
- receiving a time-resolved signal indicative of audio;
- generating time-resolved spectral data using temporally localized spectral representations of the time-resolved signal;
- determining detection of voice by comparing first filtered data and second filtered data, the first filtered data formed by attenuating temporal variations of the time-resolved spectral data based on a first timescale, the second filtered data formed by attenuating temporal variations of the time-resolved spectral data based on a second timescale different than the first timescale, including
  - evaluating a frequency-weighted average of distances between the first filtered data and the second filtered data, the distances being associated with corresponding spectral components represented in the time-resolved spectral data, and
  - comparing the frequency-weighted average to a predetermined detection threshold; and
- generating a time-resolved output indicative of noise-reduced audio by processing the time-resolved signal to attenuate the non-voice content relative to the voice content based on determined detection of voice.

2. The method of claim 1, wherein the time-resolved signal is a single-source signal generated by a microphone.

3. The method of claim 1, wherein generating the time-resolved spectral data includes using temporally localized short-time Fourier transforms of the time-resolved signal.

4. The method of claim 1, wherein the time-resolved spectral data are indicative of magnitudes of components of temporally localized short-time Fourier transforms of the time-resolved signal.

5. The method of claim 1, wherein the first filtered data are generated by passing the time-resolved spectral data through a first low-pass filter defining a first time constant associated with the first timescale, the second filtered data are generated by passing the time-resolved spectral data through a second low-pass filter defining a second time constant associated with the second timescale.

6. The method of claim 5, wherein the first low-pass filter and the second low-pass filter are first-order low-pass filters defining respective first and second time constants, the first time constant being between ⅛ seconds to ½ seconds, the second time constant being between 1 second to 10 seconds.

7. The method of claim 5, wherein the first low-pass filter and the second low-pass filter are first-order low-pass filters defining respective first and second time constants, the second time constant being between 3 to 8 times the first time constant.

8. The method of claim 1, wherein determining detection of voice by comparing the first filtered data and the second filtered data includes evaluating the deviation of the first filtered data and the second filtered data away from each other for each spectral component represented in the time-resolved spectral data.

9. The method of claim 1, wherein determining detection of voice by comparing the first filtered data and the second filtered data includes generating time-resolved detection data indicative of detection of voice, and wherein generating a time-resolved output indicative of noise-reduced audio by processing the time-resolved signal to attenuate non-voice content relative to voice content based on determined detection of voice includes using the time-resolved detection data to attenuate non-voice content relative to voice content.

10. The method of claim 9, further comprising:
- receiving a user-generated signal indicative of an amount of noise reduction; and
- applying an adjustment gain to the time-resolved detection data based on the user-generated signal.

11. The method of claim 10, further comprising low-pass filtering the time-resolved detection data after applying the adjustment gain to smoothen temporal variations in the time-resolved detection data.

12. The method of claim 9, wherein the time-resolved detection data is indicative of a Boolean variable representing whether voice is detected in the time-resolved signal or not.

13. The method of claim 1, wherein processing the time-resolved signal to attenuate non-voice content relative to voice content based on determined detection of voice includes spectral subtraction of noise from the time-resolved signal only when voice is not detected.

14. The method of claim 1, wherein the non-voice content is noise with a spectrum that is stationary or slowly-varying relative to at least one of the first timescale or the second timescale.

15. The method of claim 1, wherein the first timescale is greater than the second timescale, and a spectrum of the non-voice content varies over a timescale greater than the second timescale such that a frequency-weighted sum of squared differences, over frequencies associated with voice and non-voice content, between components of a time-average of the spectrum of the non-voice content over the first timescale and components of a time-average of the spectrum of the non-voice content over the second timescale is at most 0.1% of a frequency-weighted sum of squares of components of a time-average of the spectrum of the non-voice content over the first timescale.

16. A non-transitory computer-readable medium or media having stored thereon machine interpretable instructions which, when executed by a processor of a computing device, cause the processor to perform the method of claim 1.

17. A noise-reduction microphone for enhancing, with low latency and in real-time, voice content of captured audio signals relative to non-voice content, comprising:

a housing;

a transducer disposed in the housing and configured to convert sound waves to a time-resolved signal indicative of audio;

a processor disposed in the housing and coupled to the transducer;

memory coupled to the processor and storing processor-executable instructions that, when executed, configure the processor to:

receive the time-resolved signal from the transducer, generate time-resolved spectral data based on the time-resolved signal, determine detection of voice by comparing first filtered data and second filtered data, the first filtered data formed by attenuating temporal variations of the time-resolved spectral data based on a first timescale, the second filtered data formed by attenuating temporal variations of the time-resolved spectral data based on a second timescale different than the first timescale, including by evaluating a frequency-weighted average of distances between the first filtered data and the second filtered data, the distances being associated with corresponding spectral components represented in the time-resolved spectral data, and comparing the frequency-weighted average to a predetermined detection threshold, and generate a time-resolved output indicative of noise-reduced audio by processing the time-resolved signal to attenuate non-voice content relative to voice content based on determined detection of voice; and an output port coupled to the processor and configured to transmit the time-resolved output.

18. The noise-reduction microphone of claim 17, wherein the transducer is an electrical transducer coupled to a power supply, the processor operably coupled to the power supply.

19. A noise reduction system, comprising:

a processing circuitry configured to receive a time-resolved signal indicative of audio, generate time-resolved spectral data based on the time-resolved signal, determine detection of voice by comparing first filtered data and second filtered data, the first filtered data formed by attenuating temporal variations of the time-resolved spectral data based on a first timescale, the second filtered data formed by attenuating temporal variations of the time-resolved spectral data based on a second timescale different than the first timescale, including by evaluating a frequency-weighted average of distances between the first filtered data and the second filtered data, the distances being associated with corresponding spectral components represented in the time-resolved spectral data, and comparing the frequency-weighted average to a predetermined detection threshold, and generate a time-resolved output indicative of noise-reduced audio by processing the time-resolved signal to attenuate non-voice content relative to voice content based on determined detection of voice; and an output port in electrical communication with the processing circuitry to transmit the time-resolved output to an external device.

20. The noise reduction system of claim 19, wherein the first timescale is greater than the second timescale, and a spectrum of the non-voice content varies over a timescale greater than the second timescale such that a frequency-weighted sum of squared differences, over frequencies associated with voice and non-voice content, between components of a time-average of the spectrum of the non-voice content over the first timescale and components of a time-average of the spectrum of the non-voice content over the second timescale is at most 0.1% of a frequency-weighted sum of squares of components of a time-average of the spectrum of the non-voice content over the first timescale.

* * * * *